Oct. 13, 1931.    R. B. SIMNING    1,826,960
VEHICLE TRANSPORT CONSTRUCTION
Filed Oct. 2, 1929    2 Sheets-Sheet 1
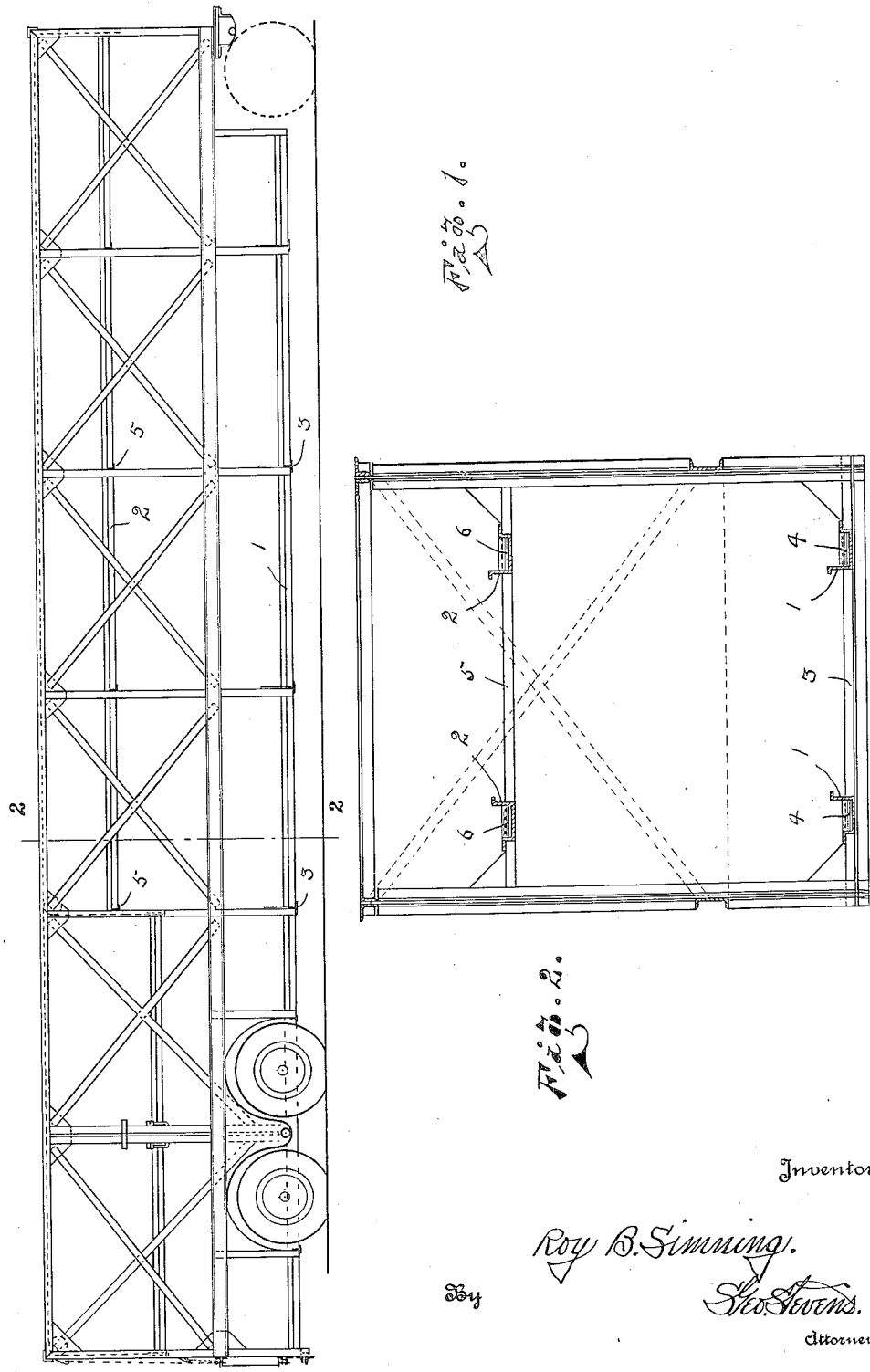
Inventor
Roy B. Simning.
By Geo Stevens.
Attorney Oct. 13, 1931.  R. B. SIMNING  1,826,960
VEHICLE TRANSPORT CONSTRUCTION
Filed Oct. 2, 1929   2 Sheets-Sheet 2

Inventor
Roy B. Simning.
By
Geo Stevens.
Attorney

Patented Oct. 13, 1931

1,826,960

UNITED STATES PATENT OFFICE

ROY B. SIMNING, OF DETROIT, MICHIGAN

VEHICLE TRANSPORT CONSTRUCTION

Application filed October 2, 1929. Serial No. 396,909.

This invention relates to vehicle carrying vehicles and has special reference to a novel form of fabrication of same.

The principal object is to produce as strong and serviceable a structure as possible, occupying the minimum of space and affording maximum road clearance.

Other objects and advantages of the invention will appear in the following description thereof.

Referring now to the accompanying drawings, forming part of this application and wherein like reference characters indicate like parts:

Figure 1 is a side elevation of a fabricated metal vehicle embodying the invention;

Figure 2 is a sectional view on the line 2—2 of Figure 1 looking forwardly;

Such vehicle bodies are usually made of fabricated angle, channel and bar iron, and in the construction here shown the tracks for the lowermost vehicle being carried are indicated at 1 and represent substantially channel shaped structures, while similarly shaped tracks 2 are shown for the uppermost carried vehicles.

Figure 4:
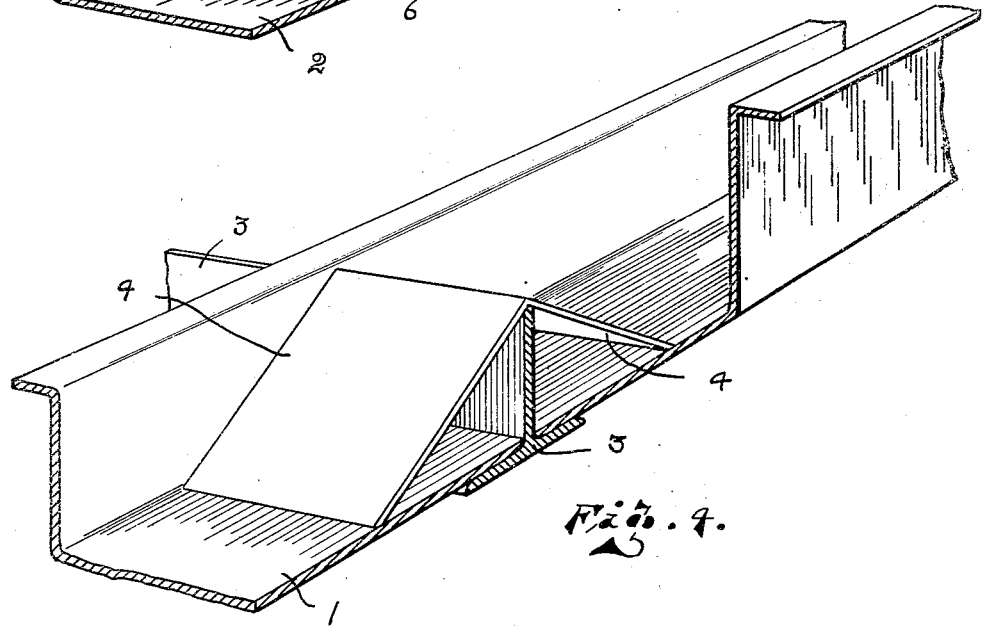
Figure 4 is a similar view of the lowermost runway or track in such vehicle; as the one here disclosed is representative of what is commonly known as a double deck vehicle transport.

It being essential that such a vehicle occupy the least vertical space possible and yet have sufficient road clearance, necessitates maximum economy of space intermediate of the upper and lower tracks, and also, as is quite obvious, the structure must be amply strong for the load so widely distributed thereupon, requiring particularly strong transverse girders, to which end I have herein shown the lowermost transverse girders 3 as being made of T-iron with the central or stem section uppermost, and which in order to maintain maximum strength must be continuous, but these girders having to pass through the channel tracks for the carried vehicles necessitates the latter surmounting same when being loaded or unloaded; to accommodate which I provide toe boards or ramps 4 leading over the web or stem of the T-iron, as clearly shown in Figure 4 of the drawings. To accomplish this assembly it is evident that the bottom of the channel must be cut as well as the opposed sides to permit of the T-iron extending therethrough, but a substantial union of the iron with the channel about the cut joint may be accomplished by welding, and the ramps 4 furnish reinforcement about the joint.

Figure 3:
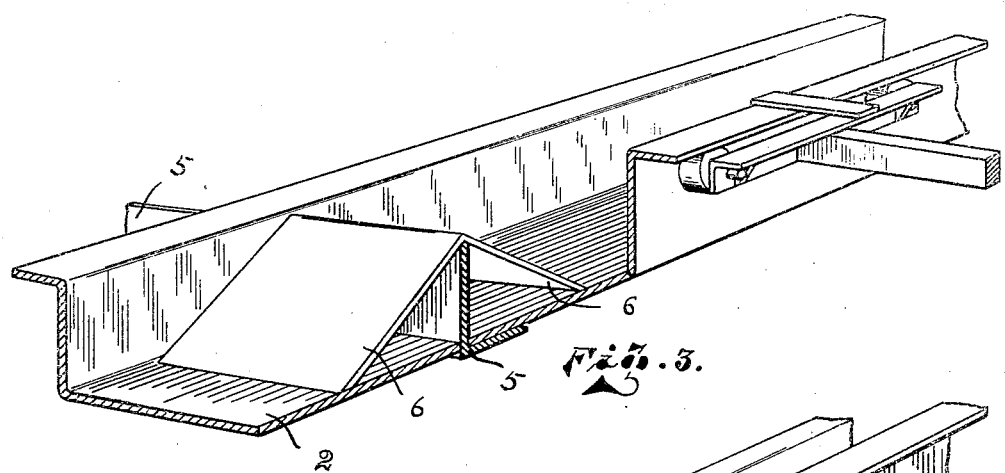
Figure 3 is a perspective view of a fragmental portion of one of the upper tracks in the vehicle body for the accommodation of the carried vehicles.

In Figure 3 is illustrated a similar structure for the upper runways or tracks 2 except that the transverse beam employed in this event is an angle bar illustrated at 5 passing through the bottom of the channels 2, the upstanding web of said angle bar being surmounted by the ramps 6, providing a substantial and strong job, having been proven in practice to in no way jeopardize the strength of the body of the vehicle and accomplishes the results set forth.

Having thus described my invention, what I claim and desire to secure by Letters Patent, is:

1. The combination with a vehicle body of the type described having channel shaped tracks disposed longitudinally thereof, of angular transverse girders forming a part of the body structure and extending through said tracks, completely severing the bottom of said tracks and supporting same from beneath at said severed point.

2. The combination with a vehicle body of the type described having channel shaped tracks disposed longitudinally thereof, of angular transverse girders forming a part of the body structure and extending through said tracks, and ramps surmounting that portion of the angle bars within the tracks.

3. A fabricated structure having channel-like runways therein characterized by having transverse girders of said structure passing directly through the runways severing the bottom thereof and supporting same at said severed point, and ramps surmounting that portion of said girders within the runways.

4. A fabricated structure having channel-like runways therein, characterized by having transverse girders of said structure passing directly through the tracks, and inclined ramps surmounting said girders in the tracks.

5. A fabricated vehicle body structure including channel shaped tracks having a transverse slot in the base and extending up the sides thereof, and angular transverse girders having a flange thereof extending within said slot, and reinforcing said channel.

6. A fabricated vehicle body structure including channel shaped tracks having a transverse slot in the base and extending up the sides thereof, angular transverse girders having a flange thereof extending within said slot and reinforcing said channel, and ramps extending over said flanges within said channels.

In testimony whereof I affix my signature.

ROY B. SIMNING.